(12) United States Patent
Jackson

(10) Patent No.: US 12,047,647 B2
(45) Date of Patent: *Jul. 23, 2024

(54) METHODS AND APPARATUS FOR PRESENTING CONTENT SELECTION MENUS

(71) Applicant: DISH TECHNOLOGIES L.L.C., Englewood, CO (US)

(72) Inventor: Markus Wayne Jackson, Englewood, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,271

(22) Filed: Dec. 28, 2022

(65) Prior Publication Data

US 2023/0142619 A1      May 11, 2023

Related U.S. Application Data

(63) Continuation of application No. 17/867,437, filed on Jul. 18, 2022, now Pat. No. 11,638,065, which is a continuation of application No. 12/611,650, filed on Nov. 3, 2009, now Pat. No. 11,418,842.

(51) Int. Cl.
| | |
|---|---|
| *H04N 21/47* | (2011.01) |
| *H04N 21/41* | (2011.01) |
| *H04N 21/431* | (2011.01) |
| *H04N 21/442* | (2011.01) |
| *H04N 21/45* | (2011.01) |
| *H04N 21/454* | (2011.01) |
| *H04N 21/482* | (2011.01) |

(52) U.S. Cl.
CPC ....... *H04N 21/47* (2013.01); *H04N 21/41265* (2020.08); *H04N 21/4316* (2013.01); *H04N 21/44231* (2013.01); *H04N 21/4516* (2013.01); *H04N 21/454* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 5,990,927 A | 11/1999 | Hendricks et al. | |
| 6,930,661 B2 | 8/2005 | Uchida | |
| 7,350,157 B1 * | 3/2008 | Billmaier | ........... H04N 21/4316 715/810 |
| 7,877,779 B2 | 1/2011 | Kwon et al. | |
| 8,234,668 B2 * | 7/2012 | Potrebic | ............... H04N 21/454 725/38 |
| 2003/0053000 A1 | 3/2003 | Testin et al. | |
| 2004/0246372 A1 | 12/2004 | Megeid | |
| 2005/0251821 A1 | 11/2005 | Pina | |

(Continued)

*Primary Examiner* — Jason K Lin
(74) *Attorney, Agent, or Firm* — Jeremiah J. Baunach; Frontier IP Law PLLC

(57) ABSTRACT

A content output device identifies a set of content including both high definition content and standard definition content. The content output device determines whether an associated presentation device is capable of presenting high definition content. The content output device then filters the set of content accordingly responsive to determining whether the presentation device is capable of presenting high definition content.

20 Claims, 6 Drawing Sheets

(56) References Cited

U.S. PATENT DOCUMENTS

| | | |
|---|---|---|
| 2006/0050657 A1 | 3/2006 | Lee |
| 2006/0072751 A1* | 4/2006 | Sakuma ............... H04N 21/485 |
| | | 348/E5.111 |
| 2006/0245725 A1* | 11/2006 | Lim ................. H04N 21/44231 |
| | | 386/E5.07 |
| 2007/0101370 A1 | 5/2007 | Calderwood |
| 2007/0127523 A1* | 6/2007 | Marrow ................. H04N 5/775 |
| | | 386/E5.07 |
| 2008/0155614 A1 | 6/2008 | Cooper et al. |
| 2008/0201748 A1 | 8/2008 | Hasek et al. |
| 2008/0222703 A1* | 9/2008 | Mantani ............... H04L 9/3271 |
| | | 726/3 |
| 2008/0229370 A1 | 9/2008 | Zustak et al. |
| 2008/0303946 A1 | 12/2008 | Cox et al. |
| 2009/0257729 A1 | 10/2009 | Ahn |
| 2010/0068990 A1 | 3/2010 | Choyi et al. |
| 2010/0162292 A1 | 6/2010 | Potrebic et al. |
| 2010/0169945 A1 | 7/2010 | Kennedy et al. |
| 2010/0175098 A1 | 7/2010 | Zustak et al. |
| 2010/0195001 A1 | 8/2010 | Doyle |
| 2010/0216508 A1 | 8/2010 | Ma et al. |
| 2011/0102683 A1 | 5/2011 | Josephs |
| 2014/0223503 A1* | 8/2014 | Govande ................ H04L 67/51 |
| | | 725/116 |

* cited by examiner

|  |  | 400 |  |
| --- | --- | --- | --- |

| (5) 7:00 - BASKETBALL GAME THE TITANS FACE OFF AGAINST THE GIANTS IN A BITTER MATCH-UP BETWEEN THE LEAGUES BIGGEST GUYS | ④ 👤👤👤👤👤 5 PEOPLE | | |
| --- | --- | --- | --- |
| Tues, Jan 1 | 7:00 | 8:00 | 8:30 |
| NATIONAL 2 (HD) | FUNNY GUYZ | | BEST SINGERS |
| THE NEWS 3 | FUNNY GUYZ | | NEWS OF THE DAY |
| KIDZ 4 | NUMBERS | CHILDREN'S STREET | COOL SCIENCE |
| SPORTS 5 (HD) | BASKETBALL GAME TITANS VS. GIANTS | | |
| MOVIES 1 6 (HD) | MOON WARS | | |
| MOVIES 2 7 (HD) | HOSTAGE SITUATION | | |

*FIG. 4*

METHODS AND APPARATUS FOR PRESENTING CONTENT SELECTION MENUS

BACKGROUND

Many television receivers and other video output devices are capable of outputting both standard definition and high definition content. Often, content is transmitted in both a standard definition format and a high definition format. For example, a satellite provider may transmit a standard definition feed of a sports channel and may simultaneously transmit a substantially identical high definition feed of the channel. The paired high definition feed and standard definition feed are transmitted as different services over the distribution network and may be assigned different user accessible channel numbers and/or the same channel numbers. Typically, both channels will appear in an electronic program guide for selection by a user. If the user has a high definition television, then they may not have an interest in seeing the standard definition version of the channel in the electronic programming guide. Similarly, the user with a standard definition television may not have any interest in seeing the high definition version of the channel in the electronic programming guide. Thus, from a user's perspective, it would be desirable for the electronic programming guide to be filtered depending on the output format of the television receiver to remove duplicative services for which the user is unlikely to view.

BRIEF DESCRIPTION OF THE DRAWINGS

The same number represents the same element or same type of element in all drawings.

FIG. 4 illustrates an embodiment of an electronic programming guide screen generated by the processor in accordance with the techniques described herein.

DETAILED DESCRIPTION OF THE DRAWINGS

Figure 1:
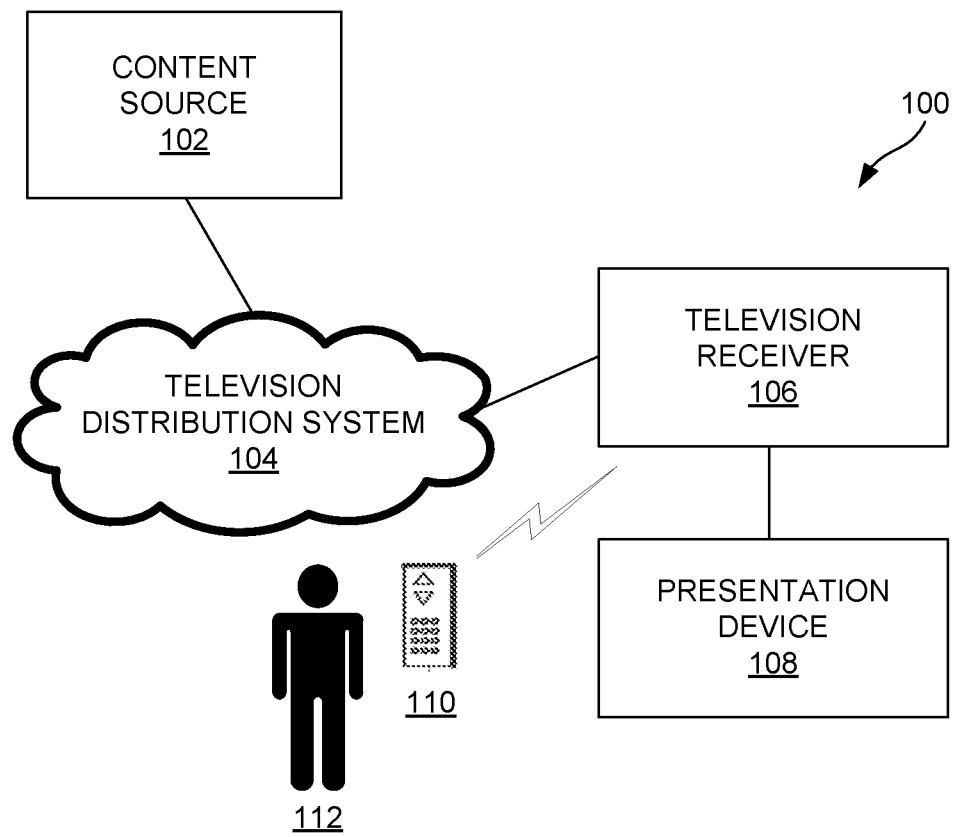
FIG. 1 illustrates an embodiment of a communication network.

Described herein are systems, methods and apparatus for presenting a content selection menu. More particularly, described herein are systems, methods and apparatus for determining whether a presentation device is capable of presenting high definition content and filtering the content selection menu accordingly to remove duplicative content which is not compatible with the output format of the presentation device. In short, described herein are systems, methods and apparatus for filtering duplicative content from a content selection menu.

As used herein, a content selection menu refers to any type of interface allowing a user to select content for viewing/playback. Content may be video content, audio content, audio/video content or the like. In one embodiment, a content selection menu is an electronic programming guide, allowing a user to view and/or select television broadcast programming. However, content selection menus may also include video-on-demand selection menus, digital video recorder selection menus, audio content selection menus (e.g., internet radios, MP3 playback systems), internet streaming video selection menus, selection menus of locally stored audio/video content or any combination thereof.

At least one embodiment comprises a video output device. The video output device includes an output interface that communicatively couples to a display device. The video output device also includes a processor operable to determine whether the display device is capable of presenting high definition content. The processor also identifies a set of video programming available for output and filters the set of video programming responsive to a determination regarding whether the display device is capable of presenting high definition content. For example, the processor may filter duplicative standard definition programming from the set of video programming if the display device is capable of presenting high definition content. Likewise, if the display device is not capable of presenting high definition content, then the processor may filter duplicate high definition programming from the set of video programming presented in the content selection menu. The processor then outputs a selection menu, identifying the filtered set of video programming, for presentation by the display device.

The techniques illustrated herein will be described in the context of a television broadcast system and more particularly as applied to a television receiver. Exemplary television receivers include cable television receivers, terrestrial over-the-air television receivers and internet protocol television receivers. However, it is to be appreciated that the techniques described herein may be applied to other types of audio and/or video output devices having content selection menus. For example, the techniques described herein may be applied to portable video players, personal computers with audio/video playback software, mobile telephones, video game consoles and the like.

FIG. 1 illustrates an embodiment of a communication network 100. The communication network includes a content source 102, a television distribution system 104, a television receiver 106, a presentation device 108 and a remote control 110. Each of these components will be discussed in greater detail below. The communication network 100 may include other components, elements or devices not illustrated for the sake of brevity.

The content source 102 is operable for receiving, generating and communicating content to one or more television receivers 106. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the television receiver 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television distribution systems. In at least one embodiment, the television distribution system 104 broadcasts or multicasts content to a plurality of television receivers 106. The television distribution system 104 may also distribute content to a specific addressable television receiver 106, such as video-on-demand content and the like. In at least one embodiment, the content source 102 may be embodied as a transmission facility of the television distribution system 104. Exemplary content sources 102 include over-the-air (OTA) terrestrial transmission facilities, cable television distribution head-ends, satellite television uplink centers, broadband or internet servers and the like. The television distribution system 104 may also distribute non-video content, such as electronic programming guide data and the like which is processed by the television receiver 106.

The television receiver 106 is operable to receive content from the television distribution system 104 and output the received content for presentation by the presentation device 108. In at least one embodiment, the presentation device 108 is a display device (e.g., a television) configured to display content to a user 112. The television receiver 106 may receive an audio/video stream in any format (e.g., analog or digital format) and output the audio/video stream for presentation by the presentation device 108. In at least one embodiment, the television receiver 106 is a set-top box (e.g., a satellite television receiver, cable television receiver, terrestrial television receiver, internet protocol television receiver or any other type of receiver/converter box) or other similar device that processes and provides one or more audio and/or video output streams to the presentation device 108 for presentation to the user 112. The television receiver 106 may be further configured to output menus and other information that allow the user 112 to control the output of audio/video content by the television receiver 106, view electronic programming guides, set recording timers and the like.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver, such as a television with integrated CableCard functionality.

The user 112 may control the television receiver 106 using a remote control 110 or other type of data input device compatible with the television receiver. The remote control 110 may comprise any system or apparatus configured to remotely control the output of content by the television receiver 106. For example, the remote control 110 may include buttons for receiving input from the user 112. In at least one embodiment, the remote control 110 includes a touch pad for receiving input from the user 112. The remote control 110 may minimally include a transmitter, an input device (e.g., a keypad) and a processor or control logic for controlling the operation of the remote control 110. The remote control 110 may communicate commands to the television receiver 106 requesting to playback content, temporally move through content (e.g., fast-forward or reverse), adjust the volume, access electronic programming guides, set or edit recording timers, edit preferences of the television receiver 106 and the like. In some embodiments, the remote control 110 may additionally be configured to remotely control the presentation device 108. The remote control 110 may communicate with the television receiver 106 and/or the presentation device 108 through any type of wireless communication medium, such as infrared (IR) signals or radio-frequency (RF) signals.

Figure 2:
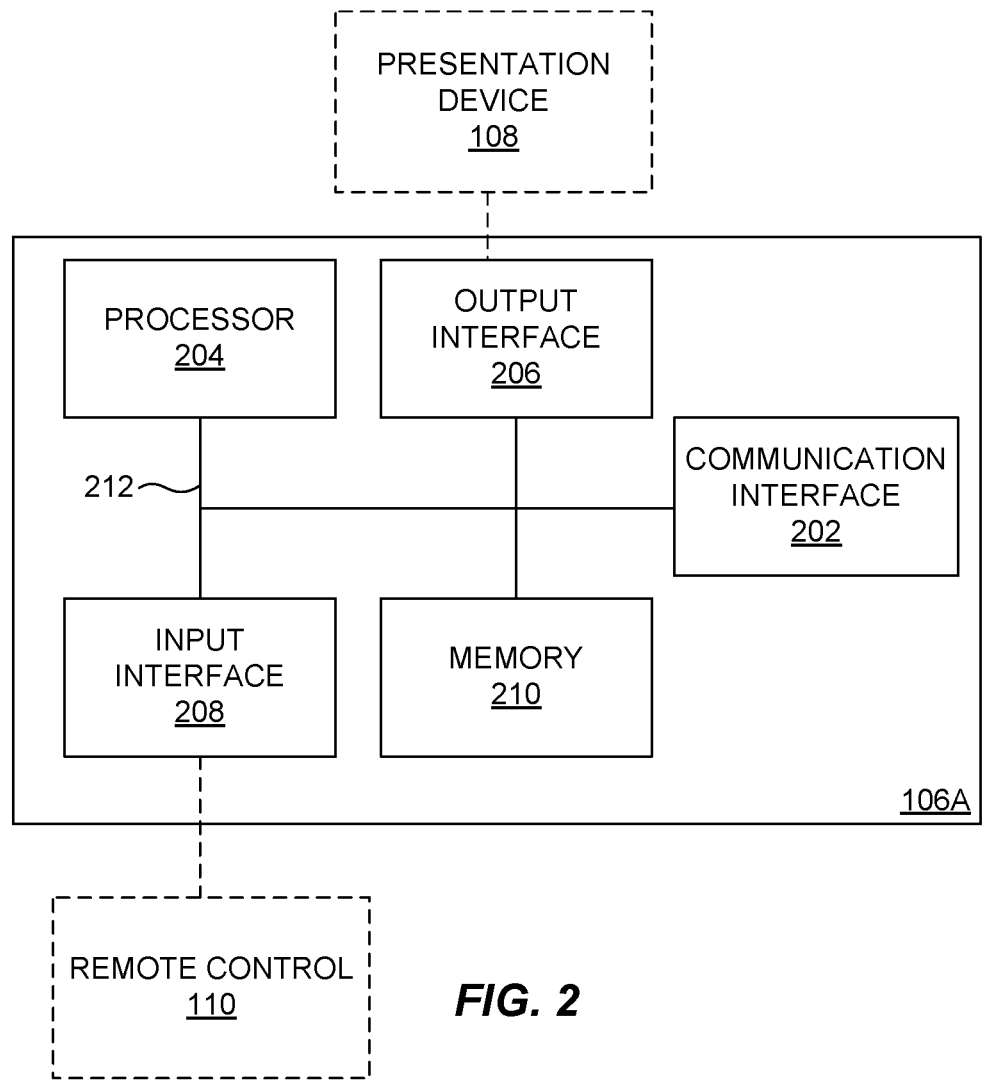
FIG. 2 illustrates an embodiment of a television receiver of FIG. 1.

FIG. 2 illustrates an embodiment of a television receiver 106 of FIG. 1. The television receiver 106A includes a communication interface 202, a processor 204, an output interface 206, an input interface 208 and a memory 210. The components of the television receiver 106A may be communicatively coupled together by one or more data buses 212 or other type of data connections.

The communication interface 202 is operable to receive content and other data from the television distribution system 104. More particularly, in at least one embodiment, the communication interface 202 receives and tunes a television signal including television programming. The communication interface 202 may receive an over-the-air (OTA) broadcast, a direct broadcast satellite signal, a cable television signal or an IPTV signal and tune the content to extract the selected television programming. In at least one embodiment, the communication interface 202 may comprise multiple tuners, utilized by the television receiver 106A to output and/or record multiple television programs simultaneously.

The processor 204 is operable for controlling the operation of the television receiver 106A. As used herein, processor 204 refers to a single processing device or a group of inter-operational processing devices. The operation of processor 204 may be controlled by instructions executable by processor 204. Some examples of instructions are software, program code and firmware. Various embodiments of processor 204 include any sort of microcontroller or microprocessor executing any form of software code. The processor 204 controls the reception of data/content by the communication interface 202 and the output of video content by the output interface 206. In at least one embodiment, the processor 204 is operable to generate content selection menus, such as electronic programming guide menus, for presentation by the presentation device 108.

The processor 204 is communicatively coupled to the memory 210, which is operable to store data during operation of the processor 204. Such data may include software and firmware executed by the processor 204 as well as system and/or program data generated during the operation of the processor 204. Memory 210 may comprise any sort of digital memory (including any sort of read only memory (ROM), RAM, flash memory and/or the like) or any combination of the aforementioned.

In at least one embodiment, the television receiver 106A optionally includes a storage medium operable to persistently store video signals recorded by the television receiver 106A. The storage medium may comprise any type of non-volatile memory appropriate for storing video signals recorded by the television receiver 106A. Exemplary storage mediums include hard drives (e.g., magnetic memory), flash memory, battery backed up memory and the like. In at least one embodiment, the storage medium may be internally located within the television receiver 106A. In other embodiments, the storage medium may be located external with respect to the television receiver 106A. The television receiver 106A may also utilize a combination of internal and external storage mediums for storage of video signals. In a recording mode, the processor 204 is operable to control the reception of content by the output interface 206 and storage of the content onto the storage medium. The processor 204 may then generate content selection menus allowing the user 112 to select recorded content for playback via the presentation device 108.

The television receiver 106A also includes an output interface 206 operable to interface with the presentation device 108. More particularly, the output interface 206 is operable to output information for presentation by the presentation device 108 (see FIG. 1). The output interface 206 may be operable to output any type of presentation data to the presentation device 108, including audio data, video data, audio/video (A/V) data, textual data, imagery or the like. In other embodiments, the output interface 206 may comprise a network interface operable to transmit data to other components, devices or elements, such as other computers, servers and the like. The output interface 206 may receive data from the processor 204 and/or other components of the television receiver 106A for output to the presentation device 108 (see FIG. 1).

In at least one embodiment, the output interface 206 may include multiple output connections operable to transmit data to the presentation device 108 in multiple formats through multiple communication mediums. For example, the output interface 206 may include a modulator operable to modulate data onto an NTSC channel for transmission to the presentation device 108 through a coaxial cable. In other embodiments, the output interface 206 may include composite or component outputs which communicatively couple to similar outputs of the presentation device 108 through appropriate cabling. In at least one embodiment, the output interface 206 comprises a High Definition Multimedia Interface (HDMI) that outputs high definition content to the presentation device 108.

In at least one embodiment, the output interface 206 bi-directionally communicates with the presentation device 108. For example, an HDMI port is capable of bi-directionally communicating with the presentation device 108. The output interface 206 may receive various types of data from the presentation device 108 over the bi-directional communication link. For example, the presentation device 108 may transmit information identifying itself and/or its capabilities to the output interface 206. Other bi-directional communication links, such as Ethernet, WiFi, IEEE 1394, USB and the like are also possible in accordance with various embodiments.

The input interface 208 is operable to interface with one or more input devices, such as the remote control 110 (see FIG. 1). The input device may comprise any type of device for inputting data to the television receiver 106A. More particularly, data received from the input device may be used to control the operation of the processor 204 and/or the output of data to the presentation device 108. The input interface 208 and the remote control 110 may be communicatively coupled using any type of wired or wireless connection, including USB, WiFi, infrared and the like. In some embodiments, the input interface 208 may comprise a wireless receiver for receiving any type of RF or IR communication from the remote control 110. Exemplary input devices include keyboards, mice, buttons, joysticks, microphones, remote controls, touch pads and the like.

In accordance with at least one embodiment, the communication interface 202 receives electronic programming guide data from the television distribution system 104. The electronic program guide data identifies television programs and/or television channels which are being currently broadcasted and/or programs which are to be broadcast in the near future. The user 112 may then select programs for viewing, recording or the like. In at least one embodiment, the electronic programming guide identifies a mixture of standard definition programming and high definition programming. Some channels/programs may be available only in standard definition or high definition, whereas other channels/programs may be available in both high definition and standard definition formats. For example, a popular channel may be broadcast as a pair of substantially identical feeds, one in high definition and another substantially identical feed that is broadcast in standard definition.

Table #1 illustrates an embodiment of a set of exemplary audio/video feeds broadcast through the television distribution system 104. Each feed is identified by a virtual channel number, which is utilized by the user 112 to access the channel. A virtual channel can be available as multiple feeds in multiple formats, such as high definition or standard definition. For example, channels 2, 5 and 10 in Table #1, are available in both high definition feeds and standard definition feeds. Each feed is also identified by a separate service identifier.

Virtual Service

TABLE #1

Exemplary Set of Channels

| Channel | Identifier | Format |
|---|---|---|
| 2 | 1000 | Standard Definition |
| 2 | 1001 | HD |
| 3 | 1002 | Standard Definition |
| 4 | 1003 | Standard Definition |
| 5 | 1004 | Standard Definition |
| 5 | 1005 | HD |
| 6 | 1006 | HD |
| 7 | 1007 | HD |
| 8 | 1008 | HD |
| 9 | 1009 | Standard Definition |
| 10 | 1010 | Standard Definition |
| 10 | 1011 | HD |

Figure 3:
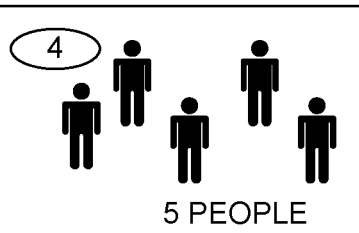
FIG. 3 illustrates an embodiment of an electronic programming guide screen.

FIG. 3 illustrates an embodiment of an exemplary embodiment of an electronic programming guide screen 300. In the electronic programming guide screen 300, each of the services 1000-1005 are presented for viewing by a user. The services 1006-1011 would be available if the user pages down in the electronic programming guide screen 300. As illustrated in FIG. 3, there are two substantially identical versions of Channels 2 and 5 presented in the electronic programming guide. However, if the user does not have a high definition television, then they may not desire to see the high definition feeds of Channels 2 and 5. Similarly, if the user has a high definition television, then they may not desire to see the standard definition feeds for Channels 2 and 5, as they are likely to want to view the high definition feeds instead.

Returning to FIG. 2, in accordance with at least one embodiment, the television receiver 106A filters the electronic programming guide in accordance with the output capabilities of the presentation device 108. The processor 204 is operable to determine whether the display device is capable of presenting high definition content. For example, in one embodiment, the processor 204 may process information received by the output interface 206 from the presentation device 108 to identify that the presentation device 108 is capable of presenting high definition content. In other embodiments, the processor 204 may be operable to identify which output port of the output interface 206 is coupled to the presentation device 108, either via sensors or user input identifying the same.

The processor 204 receives and processes a set of video programming available for output. For example, the processor 204 may receive and process electronic programming guide data identifying programs/channels available for viewing. The processor 204 is further operable to filter the set of video programming responsive to a determination regarding whether the presentation device 108 is capable of presenting high definition content.

In at least one embodiment, if the processor 204 determines that the presentation device 108 is capable of presenting high definition content, then the processor 204 filters at least a portion of the standard definition content in the set of video programming. For example, the processor 204 may filter any standard definition content having a corresponding high definition counterpart. Referring back to Table #1, the processor 204 may filter service identifiers 1000 (standard definition version of channel 2), 1004 (standard definition version of channel 5) and 1010 (standard definition version of channel 10).

FIG. 4 illustrates an embodiment of an electronic programming guide screen 400 generated by the processor 204 in accordance with the techniques described herein. As illustrated in FIG. 4, the electronic programming guide screen 400 includes both standard definition and high definition channels. However, the electronic programming guide screen 400 does not include standard definition versions of channels which have a high definition version, such as channel 2 or channel 5. However, if there is no high definition version of a channel, such as channel 3 or 4, then the electronic programming guide screen 400 includes the guide information for the standard definition channel.

The processor 204 may operate similarly to filter high definition programming if the presentation device 108 is not capable of presenting high definition content. For example, referring to Table #1, the processor 204 may filter service identifiers 1001 (high definition version of channel 2), 1005 (high definition version of channel 5) and 1011 (high definition version of channel 10) from the set of programming.

The previously described techniques allow a user to see one selection option for each piece of content or channel, even if the content is available in both standard definition and high definition formats. Duplicative content is removed from the electronic programming guide, reducing the size of the electronic programming guide. In other words, the user 112 can scroll through fewer screens to see all of the programming listed in the electronic programming guide. The user 112 still sees each piece of content which is available and the processor 204 can reformat the content for presentation in accordance with the capabilities of the presentation device 108 (e.g., down-convert high definition content or up-convert standard definition content). Thus, because the electronic programming guide does not include duplicative content, the user 112 may scroll through an electronic programming guide faster and/or view more content within a single screen.

In at least one embodiment, the processor 204 may be configured to remove all instances of specific formats of content, depending on desired design criteria. For example, if the presentation device 108 is capable of presenting high definition content, then the processor 204 may be operable to filter from the set of programming instances of standard definition content or channels. Referring back to Table #1, the processor 204 may be operable to filter services 1000, 1002, 1003, 1004, 1009 and 1010. Table #2 illustrates an embodiment of a filtered set of high definition channels.

Virtual Service

TABLE #2

Exemplary Set of Filtered High-Definition Channels

| Channel | Identifier | Format |
|---|---|---|
| 2 | 1001 | High Definition |
| 5 | 1005 | High Definition |
| 6 | 1006 | High Definition |
| 7 | 1007 | High Definition |
| 8 | 1008 | High Definition |
| 10 | 1011 | High Definition |

Similarly, the processor 204 may be operable to filter all instances of high definition channels if the presentation device 108 is not capable of presenting high definition content. Referring back to Table #1, the processor 204 may be operable to filter services 1001, 1005, 1006, 1007, 1008 and 1011 responsive to determining that the presentation device is not capable of presenting high definition content. Table #3 illustrates an embodiment of a filtered set of high definition channels.

Virtual Service

TABLE #3

Exemplary Set of Filtered Standard-Definition Channels

| Channel | Identifier | Format |
|---|---|---|
| 2 | 1000 | Standard Definition |
| 3 | 1002 | Standard Definition |
| 4 | 1003 | Standard Definition |
| 5 | 1004 | Standard Definition |
| 9 | 1009 | Standard Definition |
| 10 | 1010 | Standard Definition |

In at least one embodiment, the techniques described herein may be applied to filter listings of video-on-demand content, recorded programming or other locally stored or accessible content. For example, the television receiver 106A may be communicatively coupled to a video-on-demand server offering both standard definition content and high definition content. In some instances, the video-on-demand service may offer the same movie in both standard definition format and high definition format. Table #4 illustrates an embodiment of a set of video-on-demand programming available to the television receiver 106A.

TABLE #4

Set of Video-On-Demand Programming

| Title | Format |
|---|---|
| A Boy and His Dog | Standard Definition |
| Hostage Situation | Standard Definition |
| Hostage Situation | High Definition |
| Moon Wars | Standard Definition |
| Moon Wars | High Definition |
| Moon Wars 2 | High Definition |
| Race Day | Standard Definition |

Figure 5:
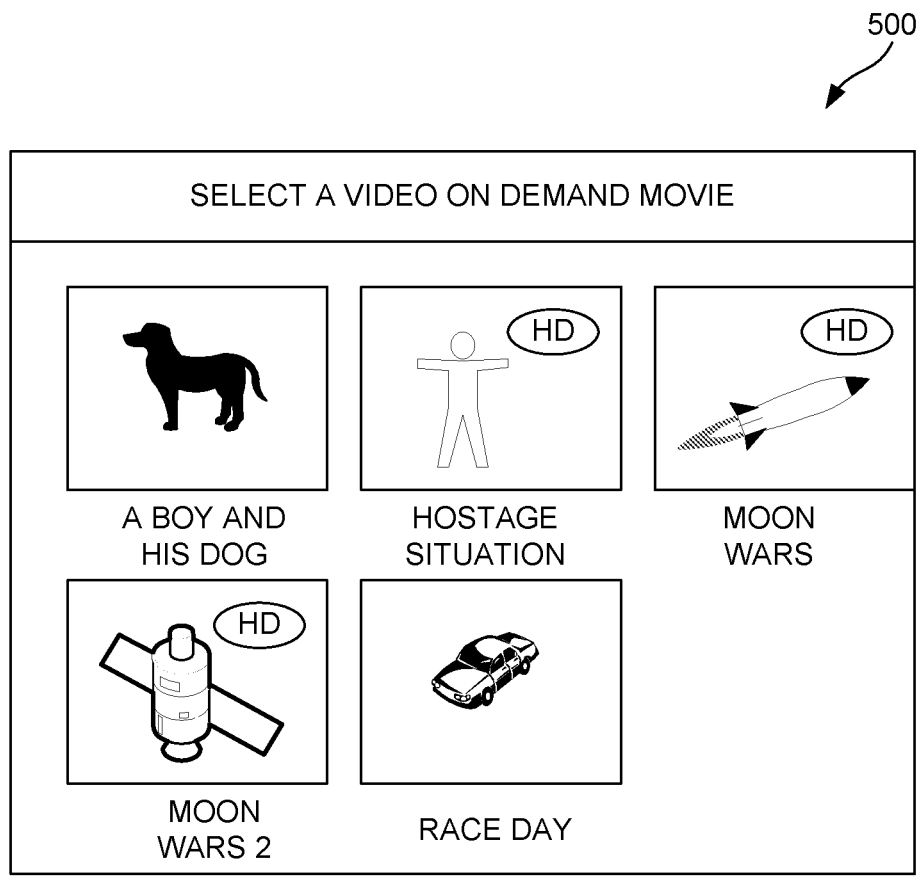
FIG. 5 illustrates one embodiment of a content selection menu generated from a filtered set of content.

If the processor 204 determines that the presentation device 108 is capable of presenting high definition content, then the processor 204 may operate to filter standard definition content, having a corresponding high definition counterpart, from the set of video programming illustrated in Table #4. FIG. 5 illustrates one embodiment of a content selection menu 500 generated from a filtered set of content. As illustrated in the menu 500, content available in multiple formats (e.g., "Hostage Situation" and "Moon Wars") is only displayed within the content selection menu 500 in the high definition format. Thus, it is easier for the user 112 to select the version of the movie that they would most likely want to view. In at least one embodiment, if the presentation device 108 is not capable of presenting high definition content, then the standard definition versions of "Hostage Situation" and "Moon Wars" would be presented in the menu 500 rather than the high definition versions.

Similar types of content selection menus 500 may be utilized for digital video recorders and locally stored content on a television receiver 106A. The filtering techniques described herein may also be utilized for presenting content on web sites, personal computers, mobile telephones, video game consoles and the like. Any video output device capable of receiving and/or outputting both high definition content and standard definition content may be enhanced according to the techniques described herein to determine display capabilities of a presentation device and filter the content selection menu accordingly.

Those of ordinary skill in the art will appreciate that the various functional elements 202 through 212 shown as operable within the television receiver 106A may be combined into fewer discrete elements or may be broken up into a larger number of discrete functional elements as a matter of design choice. For example, the processor 204, the output interface 206 and/or the input interface 208 may be combined into a single processing module. Thus, the particular functional decomposition suggested by FIG. 2 is intended merely as exemplary of one possible functional decomposition of elements within the television receiver 106A.

Figure 6:
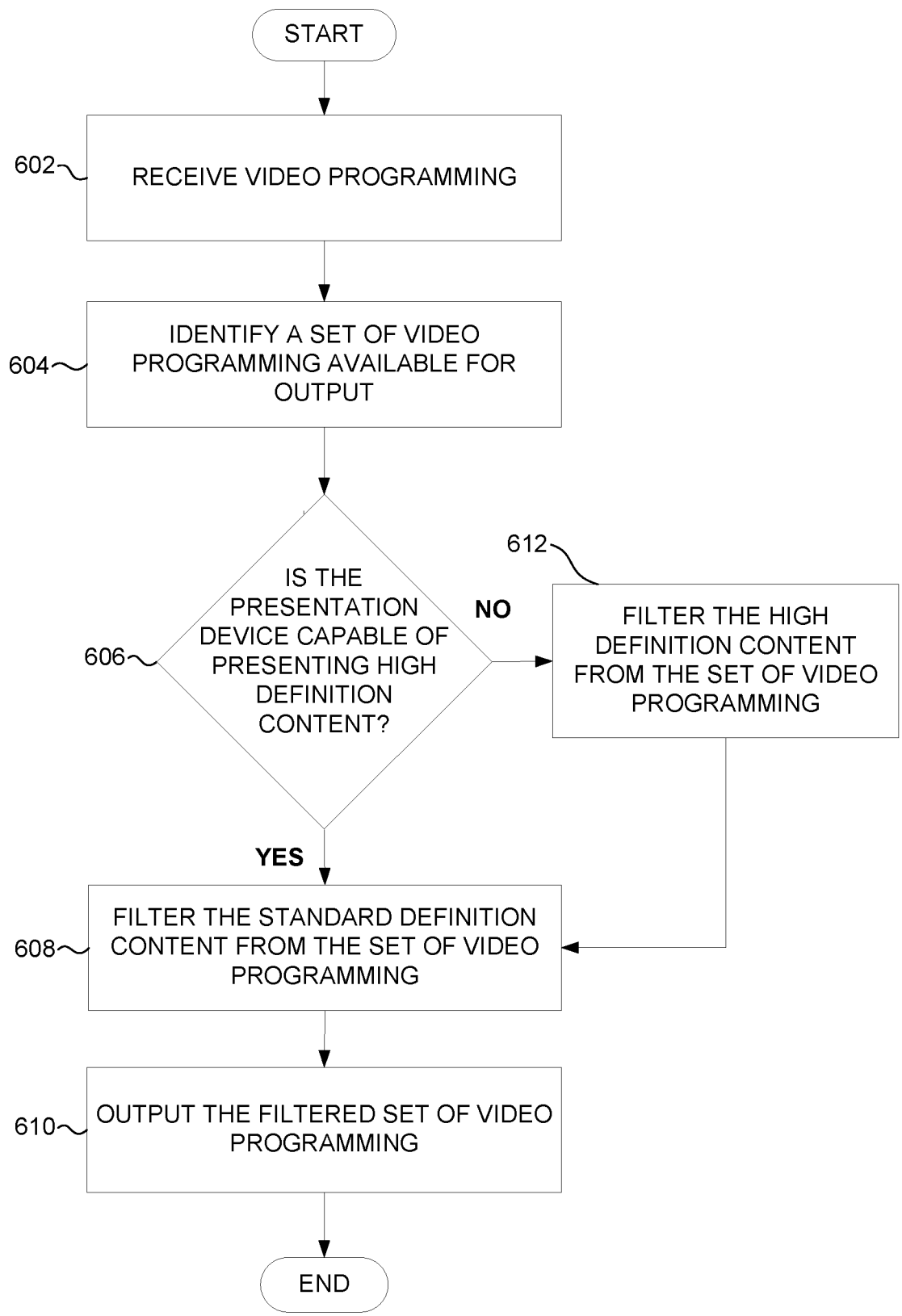
FIG. 6 illustrates an embodiment of a process for generating a content selection menu.

FIG. 6 illustrates an embodiment of a process for generating a content selection menu. The process of FIG. 6 will be described in the context of generating an electronic programming guide menu. However, it is to be appreciated that the process may be applied to generating other content selection menus. The process of FIG. 6 is not all-inclusive and may include other operations not illustrated for the sake of brevity.

The process includes receiving video programming at a video output device (operation 602). For example, a cable television receiver may receive one or more channels of video content.

The process further includes identifying a set of video programming available for output (operation 604). For example, a cable television receiver may receive electronic programming guide data specifying a plurality of channels receivable by the cable television receiver. Some channels may be formatted in high definition, whereas other channels may be formatted in standard definition. In at least one embodiment, some channels are carried in two or more simultaneous feeds, at least one of the feeds being a standard definition format and at least one of the feeds being a high definition format. For example, the channel may be carried on one service at 480i resolution, on another service at 720i resolution and on another service at 1080p resolution.

The process further includes determining whether a presentation device associated with the video output device is capable of presenting high definition content (operation 606). For example, the video output device may receive data from the presentation device identifying the presentation device and/or its capabilities (e.g., whether the presentation device can output 720i, 720p, and 1080i or 1080p resolution content). In at least one embodiment, the video output device receives the identifying data in accordance with the HDMI protocol.

If the presentation device is capable of presenting high definition content, then processing continues in operation 608. In operation 608, the video output device filters the set of video programming to remove duplicative content not compatible with the display format of the presentation device. For example, the video output device may filter standard definition programming having a corresponding high definition counterpart from the set of video programming. In at least one embodiment, if multiple high definition counterparts are available (e.g., 720p and 1080i), but the presentation device is not capable of presenting 1080i resolution content, then the 1080i version of the content may be filtered from the set of video programming. The video output device then generates a content selection menu, such as an electronic programming guide menu and outputs the filtered set of video programming in the content selection menu for presentation by the presentation device (operation 610).

Returning to operation 606, if the presentation device is not capable of outputting high definition programming, then the video output device may perform a similar process as in operation 608 and filter high definition content from the set of video programming if the high definition content has a corresponding standard definition format (operation 612). The video output device then generates a content selection menu, outputting the filtered set of video programming in the content selection menu for presentation by the presentation device (operation 610).

Although specific embodiments were described herein, the scope of the invention is not limited to those specific embodiments. The scope of the invention is defined by the following claims and any equivalents therein.

The invention claimed is:

1. A video output device comprising:
an output port interface that communicatively couples to a display, wherein the output port interface is arranged within the video output device and includes multiple physical output ports; and
a processor operable to:
identify, via a sensor, which output port of the output port interface that includes multiple physical output ports is currently coupled to the display;
electronically determine whether the display is capable of presenting high definition content based on the identification, via the sensor, of which output port of the output port interface is currently coupled to the display and corresponding capabilities of the output port that is currently coupled to the display, without receiving user input selecting an output format for any output port of the output port interface;
electronically identify a set of video programming available for output;
electronically filter the set of video programming responsive to a determination regarding whether the display is capable of presenting high definition content including electronically removing content from an electronic programming guide, thus reducing size of the electronic programming guide;
electronically output a revised electronic program guide, identifying the filtered set of video programming, for presentation by the display; and
electronically output content for presentation on the display in accordance with capabilities of the display;
wherein the processor is configured such that:

the set of video programming displayed on the electronic programming guide is filtered to display only high definition content when the sensor identifies a high definition output port of the output port interface is coupled to the display; and the set of video programming displayed on the electronic programming guide is filtered to display only standard definition content when the sensor identifies a standard definition output port of the output port interface is coupled to the display.

2. The video output device of claim 1, wherein the set of video programming includes at least one pair of a second definition service and a high definition service associated with a single broadcast channel and wherein the processor is operable to filter the second definition service from the set of video programming responsive to determining that the display is capable of presenting high definition content.

3. The video output device of claim 1, wherein the set of video programming includes at least one pair of a second definition service and a high definition service associated with a single broadcast channel and wherein the processor is operable to filter the high definition service from the set of video programming responsive to determining that the display is not capable of presenting high definition content.

4. The video output device of claim 1, wherein the set of video programming includes a plurality of high definition services and a plurality of second definition services and wherein the processor is operable to filter the plurality of second definition services from the set of video programming responsive to determining that the display is capable of presenting high definition content.

5. The video output device of claim 1, wherein the set of video programming includes a plurality of high definition services and a plurality of second definition services and wherein the processor is operable to filter the plurality of high definition services from the set of video programming responsive to determining that the display is not capable of presenting high definition content.

6. The video output device of claim 1, wherein the output port interface is operable to bi-directionally communicate with the display and wherein the processor is also operable to determine whether the display is capable of presenting high definition content based on data received by the output port interface from the display.

7. The video output device of claim 1, wherein the output port interface comprises a high definition multimedia interface (HDMI).

8. The video output device of claim 1, wherein the video output device comprises a television receiver and wherein the set of video programming comprises electronic programming guide data associated with a plurality of channels.

9. The video output device of claim 8, wherein the television receiver comprises a satellite television receiver.

10. The video output device of claim 8, wherein the television receiver comprises a cable television receiver.

11. The video output device of claim 1, wherein the video output device comprises a television receiver and wherein the set of video programming comprises video on-demand programming available through the television receiver.

12. The video output device of claim 1, further comprising a storage medium operable to store programming for subsequent viewing by a user, wherein the set of programming comprises a plurality of programs stored on the storage medium.

13. A method of operating a video output device, the method comprising:

receiving, at a video output device, a set of video programming available for viewing through the video output device;

electronically identify, via a sensor, which output port of an output port interface of the video output device is currently coupled to a display, wherein the output port interface is arranged within the video output device and includes multiple physical output ports;

electronically determining whether the display communicatively coupled to the video output device is capable of displaying high definition content based on the identification, via the sensor, of which output port of the output port interface that includes multiple physical output ports is currently coupled to the display and corresponding capabilities of the output port that is currently coupled to the display, without receiving user input selecting an output format for any output port of the output port interface;

electronically filtering the set of video programming responsive to determining that the display is capable of presenting high definition content including electronically removing content from an electronic programming guide, thus reducing size of the electronic programming guide;

electronically outputting the filtered set of video programming for presentation by the display; and electronically output content for presentation on the display in accordance with capabilities of the display;

wherein:

the set of video programming displayed on the electronic programming guide is filtered to display only high definition content when the sensor identifies a high definition output port of the output port interface is coupled to the display; and the set of video programming displayed on the electronic programming guide is filtered to display only standard definition content when the sensor identifies a standard definition output port of the output port interface is coupled to the display.

14. The method of claim 13, wherein determining whether the display communicatively coupled to the video output device is capable of displaying high definition content further comprises:

receiving data, at the video output device, from the display; and processing the data to determine whether the display is capable of displaying high definition content additionally based on the processed data.

15. The method of claim 13, wherein the set of video programming includes at least one pair of a second definition service and a high definition service associated with a single broadcast channel and wherein filtering the set of video programming further comprises:

filtering the second definition service from the set of video programming responsive to determining that the display is capable of presenting high definition content.

16. The method of claim 13, wherein the set of video programming includes a plurality of high definition services and a plurality of second definition services and wherein filtering the set of video programming further comprises:

filtering the plurality of second definition services from the set of video programming responsive to determining that the display is capable of presenting high definition content.

17. A television receiver comprising:

a communication interface operable to receive electronic programming guide data, the electronic programming guide data including at least one pair of a second definition service and a high definition service associated with a single broadcast channel;

an output port interface that communicatively couples to a display, wherein the output port interface is arranged within the television receiver and includes multiple physical output ports; and a processor operable to:
electronically identify, via a sensor, which output port of the output port interface that includes multiple physical output ports is currently coupled to the display;

electronically determine whether the display is capable of presenting high definition content based on the identification, via the sensor, of which output port of the output port interface is currently coupled to the display and corresponding capabilities of the output port that is currently coupled to the display, without receiving user input selecting an output format for any output port of the output port interface;

responsive to identifying that the display is capable of presenting high definition content, electronically filter the second definition service from the electronic programming guide data including electronically removing content from an electronic programming guide, thus reducing size of the electronic programming guide;

electronically initiate output of the filtered electronic programming guide through the output port interface for presentation by the display; and electronically output content for presentation on the display in accordance with capabilities of the display;

wherein the processor is configured such that:
a set of video programming displayed on the electronic programming guide is filtered to display only high definition content when the sensor identifies a high definition output port of the output port interface is coupled to the display; and the set of video programming displayed on the electronic programming guide is filtered to display only standard definition content when the sensor identifies a standard definition output port of the output port interface is coupled to the display.

18. The television receiver of claim 17, wherein the output port interface is operable to bi-directionally communicate with the display and wherein the processor is also operable to determine whether the display is capable of presenting high definition content based on data received by the output port interface from the display.

19. The television receiver of claim 17, wherein the output port interface comprises a high definition multimedia interface (HDMI).

20. The television receiver of claim 17, wherein the set of video programming includes a plurality of high definition services and a plurality of second definition services and wherein the processor is operable to filter the plurality of second definition services from the set of video programming responsive to determining that the display is capable of presenting high definition content.

* * * * *